Oct. 23, 1962 C. A. LINDBLOM 3,059,958
MOTOR VEHICLE CAB MOUNTING MEANS
Filed May 13, 1960 2 Sheets-Sheet 1
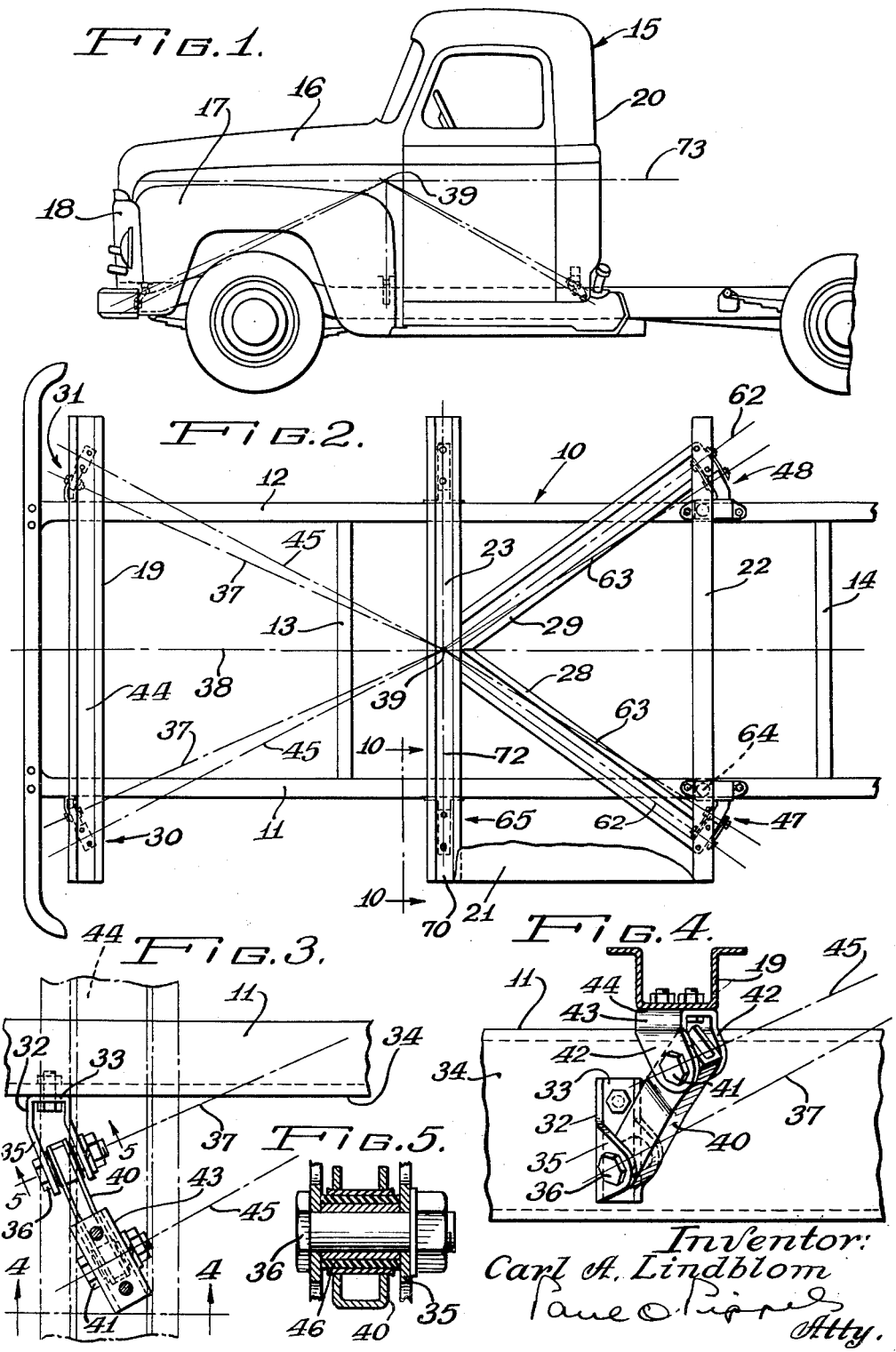
Inventor:
Carl A. Lindblom
Paul O. Pierre
Atty.

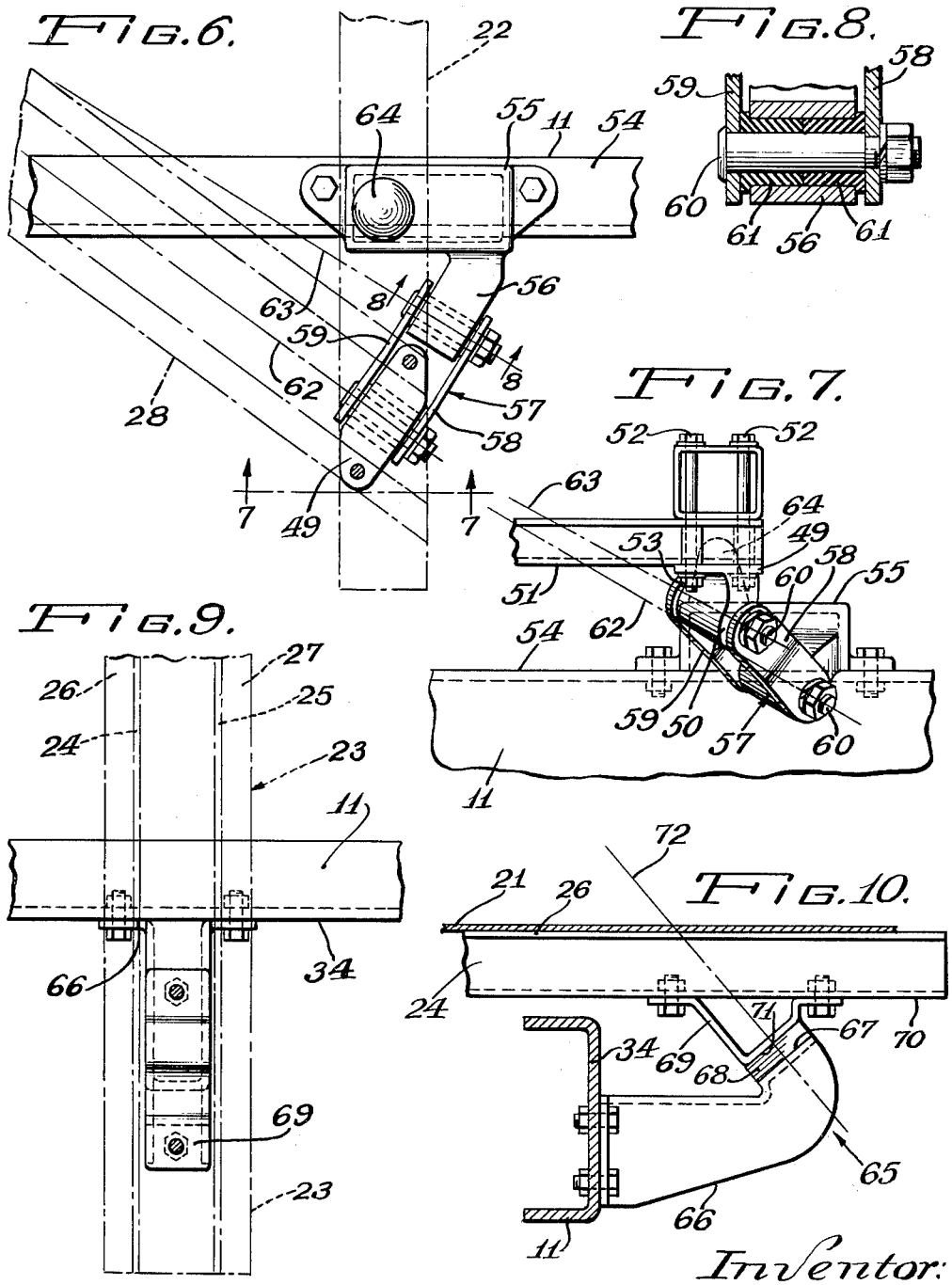

United States Patent Office
3,059,958
Patented Oct. 23, 1962

1

3,059,958
MOTOR VEHICLE CAB MOUNTING MEANS
Carl A. Lindblom, Wilmette, Ill., assignor to International Harvester Company, Chicago, Ill., a corporation of New Jersey
Filed May 13, 1960, Ser. No. 29,043
18 Claims. (Cl. 296—35)

This invention relates to motor vehicle cab mounting means, and more particularly to a new and improved mounting means and unique arrangement of the mounting connections for supporting a motor truck cab and sheet metal structure such as the hood, fenders and radiator grille panel on the chassis frame.

In the operation of motor trucks or other vehicles designed for carrying heavy loads over uneven terrain or road surface irregularities, one or more ground engaging wheels are elevated to a different level than the other wheels with the result that severe torsional stresses and forces are imposed on the chassis frame. While it is possible to construct chassis frames with sufficient rigidity to stand the torsional forces applied thereto it has been found impractical to do so. Consequently, in order to mitigate the damaging influence of the torsional forces on the chassis frame, the chassis frames are generally designed and constructed in such a way that they are relatively flexible and, thereby, capable of relieving the torsional forces imposed thereon by distortion of the frame side sills without damage thereto.

It will be appreciated that the former practice of securing the vehicle cab or operator's compartment, as well as the sheet metal work such as the hood, fenders, and radiator grille panel, which is rigidly connected to the cab, directly to the chassis frame in such a manner that very little, if any, relative movement between a chassis frame and the body structure was permitted, had to be abandoned. Various ingenious mounting means have been devised for mounting the vehicle cab on the flexible frame whereby the distorting forces and shocks to which the frame is subjected are not directly and fully transmitted to the vehicle cab to cause deformation and ultimate breakage of the sheet metal parts thereof. However, little and no consideration has been given to the problem of supporting the front end sheet metal work particularly the hood, fenders and radiator grille panel on the flexible frame which parts are also interconnected with the vehicle cab. Heretofore, it has been the usual practice in the motor truck industry to secure the radiator grille panel and thus the hood and fenders directly to the frame in a relatively rigid manner. As a result, the vehicle cab was permitted to twist and bend with respect to the front end structure when the chassis frame was subjected to torsional forces causing deformation, fatigue and ultimate breakage of the sheet metal parts interconnecting the vehicle cab and the front end sheet metal structure as well as the connection of the radiator grille panel to the frame. It is, therefore, an important objective of the present invention to provide novel means for supporting a vehicle body which includes an operator's compartment or cab, hood, fenders and radiator grille panel on a flexible chassis frame whereby the parts of the body are movable with respect to the frame as a structural composite unit in order to mitigate the transmission of forces, shocks and vibrations thereto.

Heretofore, the mounting means devised for mounting the vehicle cab on a flexible frame permitted the vehicle cab to roll or rock with respect to the chassis frame. Obviously such rolling or rocking of the vehicle cab is imparted to the vehicle operator or driver in the form of rolling and rocking sensations which adversely affected his comfort to a considerable degree. It is, therefore,

2 another object of the present invention to connect the vehicle body to the chassis frame in such a manner so as to allow a limited but adequate relative movement between the body and frame to prevent distortion of the body but which movement is transmitted to the vehicle operator to a lesser degree than heretofore possible.

A still further object is to provide means for minimizing the effect of cab roll, rock and shake on the vehicle operator.

A further object is to provide means for connecting a portion of the vehicle body to the chassis frame by a pair of transversely spaced links, each link having one end pivotally connected to the vehicle body and its opposite end pivotally connected to a respective frame side sill member and in which the pivotal axes of the connections of the links with the vehicle body and the side sill members intersect at a common point.

A still further object is to respectively connect the extreme forward and rearward end portions of the vehicle body unit including the cab, fenders and grille panel to the chassis frame by means of a pair of transversely spaced links and to secure transversely spaced intermediate portions of the vehicle body unit to the frame side sill members by means of a pair of resilient mounting connections.

A still further object is to mount the vehicle body on the chassis frame for controlled relative movement therebetween and wherein the instantaneous roll center of the vehicle body is in the vicinity normally occupied by the vehicle occupants with the result that the comfort of the vehicle occupants is less affected by the relative movement between the operator's compartment and chassis frame.

The foregoing and other important objects and desirable features inherent in and encompassed by the invention, together with many of the purposes and uses thereof, will become readily apparent from a reading of the ensuing description in conjunction with the annexed drawings, in which:

FIGURE 1 is a side elevational view of a motor vehicle embodying the invention;

FIGURE 2 is a top plan view of the forward end of the vehicle structure shown in FIGURE 1 with a portion of the vehicle body cut away to better illustrate the body cross members;

FIGURE 3 is an enlarged detailed plan view of the connection between one end of the lower edge of the grille panel and a frame side sill member, a portion of a cab frame cross member is shown in phantom lines;

FIGURE 4 is a vertical sectional view taken substantially along line 4—4 of FIGURE 3;

FIGURE 5 is a vertical sectional view taken substantially along line 5—5 of FIGURE 3;

FIGURE 6 is an enlarged detailed plan view of a rear body mounting connection, an end portion of a cab frame cross member is shown in phantom lines;

FIGURE 7 is a vertical sectional view taken substantially along line 7—7 of FIGURE 6;

FIGURE 8 is a vertical sectional view taken substantially along the line 8—8 of FIGURE 6;

FIGURE 9 is a fragmentary plan view of one of the resilient mounting connections between an intermediate cab frame cross member and a side sill member of the chassis frame, the cab frame cross member being shown in phantom lines; and FIGURE 10 is an enlarged detailed vertical sectional view taken substantially along line 10—10 of FIGURE 2.

Referring to the drawings in detail wherein like reference characters designate like elements throughout the various views, there is shown a motor truck chassis frame 10 which includes a pair of longitudinally extending, laterally spaced side sill members 11 and 12 having the conventional U-shaped or channel form. The side sill members 11 and 12 are interconnected by a plurality of longitudinally spaced, laterally extending cross members 13 and 14, only two such cross members being shown. However, it is to be understood that other cross members are provided as in conventional motor truck chassis frame constructions.

The vehicle body structure, illustrated somewhat diagrammatically in FIGURE 1, includes an operator's compartment or cab, designated in its entirety by reference character 15. Connected to the cab 15 and extending forwardly therefrom is a hood structure 16 which encloses the power plant (not shown). A pair of fenders 17 (only one is shown in FIGURE 1) are attached to respective opposite sides of the hood structure 16. Suitably secured to the forward extremity of the hood structures 16 is a vertically disposed radiator grille panel 18.

As shown in FIGURE 2, a U-shaped cross member 19 is rigidly fastened to the lower edge of the radiator grille panel 18. The cross member 19 extends transversely with respect to the chassis frame 10 and has end portions thereof disposed laterally of the side sill members 11 and 12. The back panel 20 of the cab 15 extends downwardly and is secured to the cab floor panel 21. A transversely extending rear cab cross member 22 is suitably secured to the floor panel 21. Spaced forwardly of the back panel 20 and extending transversely along the forward end of the cab 15 is a channel-shaped cab cross member 23. The legs 24, 25 of the cross member 23 extend upwardly and are provided with horizontal, oppositely projecting flanges 26, 27, respectively, which are secured to the underside of the floor panel 21. In order to increase the rigidity of the cab structure 15, a pair of rearwardly diverging channel members 28, 29 are provided. Each channel member 28, 29 has one end disposed adjacent the mid section of cross member 23 and its opposite end disposed adjacent a respective end of the rear cab cross member 22. The channel members 28, 29 are secured to the underside of the floor panel 21 by any suitable means.

The forwardmost end of the vehicle body structure, which as stated hereinbefore includes the operator's compartment 15, hood construction 16, fenders 17 and radiator grille panel 18, is connected to the chassis frame 10 by means of a pair of mounting connections 30, 31. FIGURES 3, 4 and 5 illustrate in detail the construction of mounting connection 30. It is to be understood, however, that mounting connection 31 is constructed in a like manner. Each mounting connection 30, 31 includes a substantially U-shaped bracket 32 which has its bight portion 33 rigidly fastened to the vertical web 34 of a respective side sill member 11, 12. The legs 35 of the bracket 32 are spaced and parallel with respect to each other and lie in planes which are inclined at an acute angle with respect to the vertical plane containing the web 34 of the side sill member 11 as well as at an acute angle with respect to a horizontal plane. The legs 35 carry a pivot pin 36 which extends between the legs 35. Because of the manner in which the legs 35 are oriented as pointed out above with respect to the side sill member 11, the longitudinal axis, indicated by numeral 37, of the pivot pin 36 intersects a vertical plane containing the median axis, indicated by numeral 38, of the chassis frame 10 at a point horizontally spaced rearwardly of the bracket 33 and vertically spaced above the chassis frame 10. The point where the axis 37 of the pivot pin 36 intersects the vertical plane containing the longitudinal median line 38 of the chassis frame 10 is indicated by a numeral 39. A link 40 has one end pivotally connected to the pivot pin 36. The link 40 extends generally upwardly and rearwardly from the bracket 33 and has its opposite end pivotally connected to a pivot pin 41. The pivot pin 41 is supported by a pair of spaced and parallel depending legs 42 of a bracket 43 secured to the horizontal web 44 of the end portion of the body cross member 19 overhanging the side sill member 11, as shown in FIGURES 2 and 3. The pivotal axis 45 of the link 40 and vehicle body structure which corresponds to the longitudinal axis of the pivot pin 41 intersects the vertical plane containing the longitudinal median line 38 of the chassis frame 10 at the same point 39 that the pivotal axis of pivot pin 36 intersects the vertical plane containing the longitudinal median line 38 of the chassis frame. Encircling each pivot pin 36, 41 are sleeve-like rubber bushings or insulators 46. By interposing the rubber bushings 46 between the pivot pins 36, 41 and the ends of the links 40, the connected parts are effectively insulated and limited relative pivotal movement about the axes 37 and 45 between the connected parts by deformation of the rubber bushings 46 is permitted.

Referring to FIGURES 6, 7 and 8 it will be noted that the rearward end of the vehicle body structure is similarly connected to the chassis frame 10 by means of a pair of laterally spaced mounting connections 47, 48. The mounting connections 47, 48 which are symmetrically disposed each includes a bracket 49 which is provided with a bearing portion 50. The bracket 49 is secured to the underside of the web 51 of a respective channel member 28, 29 at its extreme rearward end by means of bolts 52 and nuts 53. Attached to the uppermost flanges 54 of the side sill members 11 and 12 by any suitable means are brackets 55 which are also provided with bearing portions 56. The bearing portions 50 and 56 are each provided with a bore therethrough, the longitudinal axis of which intersects the vertical plane containing the longitudinal median line 38 of the chassis frame 10 at point 39. Interconnecting each pair of brackets 49 and 55 is a link member 57 which comprises a pair of spaced and parallel plates or bars 58, 59. Each end of the link member 57 carries a pivot pin 60 which extends through the bore of a respective bearing portion 50, 56. Disposed about each pivot pin 60 between the bars 58, 59 are a pair of rubber bushings 61 which are engaged by a respective bearing portion 50, 56 rather tightly whereby the bushings are incapable of slipping with respect to the bearing portions and the pivot pins 60. From the foregoing, it will be appreciated that the pivotal axes of all of the pivot pins 36, 41 and 60 intersect the vertical plane containing the longitudinal median line 38 of the chassis frame 10 at the point 39 which point 39 is disposed within the operator's compartment 15 in the vicinity normally occupied by the occupants of the motor truck. The utilization of rubber bushings as noted above effectively insulates the parts and allows limited relative pivotal movement of the link members 57 with respect to the chassis frame 10 and the vehicle body structure, which includes the operator's compartment 15, hood 16, fenders 17 and grille panel 18, about pivotal axes 62 and 63 which pivotal axes correspond to the longitudinal axes of the pivot pins 60.

In order to prevent metal-to-metal contact when the vehicle body structure is caused to move relatively toward the chassis frame 10, an upwardly projecting pad 64 of rubber or like cushioning material is suitably secured to each bracket 55 as shown in FIGURES 2, 6 and 7. From the foregoing, it will be appreciated that the point 39 where all of the pivotal axes 37, 45, 62 and 63 intersect is in effect the instantaneous roll center of the composite unitary vehicle body structure and since such instantaneous roll center is in the vicinity of the center of gravity of the vehicle occupants the limited relative movement of the vehicle body structure with respect to the chassis frame 10 permitted by the mounting connections 30, 31, 47 and 48 is less apt to adversely affect the comfort of the vehicle occupants. In other words, while the vehicle body structure is capable of moving relatively with respect to the chassis frame 10 whereby the distorting forces and shocks to which the frame is subjected to are not directly and fully transmitted to the vehicle body structure to cause deformation and ultimate breakage of the sheet metal parts thereof, the rolling and rocking sensations imparted to the vehicle occupants when the vehicle body structure moves relatively to the chassis frame 10 are substantially reduced. Thus the comfort of the vehicle occupants is enhanced considerably.

To further support the vehicle body structure on the chassis frame 10 for relative movement therebetween and to stabilize such movement, a pair of mounting connections, each designated in their entirety by numeral 65, are provided. Each mounting connection 65 comprises a bracket structure 66 which is secured to and extends laterally outwardly from the web 34 of a respective side sill member 11, 12. The free end of the bracket structure 66 is defined by a flat surface 67 which lies in a plane disposed at an acute angle with respect to a horizontal plane. The flat surface 67 serves as a support for a layer or pad 68 of resilient material such as rubber. As best shown in FIGURE 10, each end portion of the cab cross member 23 has a depending bracket 69 secured to the underside of the web 70 thereof. Each depending bracket 69 is provided with a flat surface 71 which is spaced and parallel to the flat surface 67 of a respective bracket structure 66 and is adapted to seat itself upon the resilient pad 68. From the foregoing it will be appreciated that because of the orientation of each pair of related flat surfaces 67 and 71 a line, indicated by numeral 72, perpendicular to the surfaces 67 and 71 and passing through the center of such surfaces intersect the vertical plane containing the longitudinal median line 38 of the frame at the instantaneous roll center point 39. From the foregoing, it will be appreciated that the mounting connections 65 permit the vehicle body structure to pivot slightly relatively to the chassis frame about a longitudinally extending axis indicated by numeral 73 to release the stresses and forces applied thereto by twisting and distorting of the chassis frame 10 during operation of the vehicle but since the flat surfaces 67 and 71 are orientated in a manner as pointed out hereinbefore the longitudinal pivotal axis 73 extends through the instantaneous roll center 39. As a result the relative pivotal movement of the vehicle body structure with respect to the chassis frame 10 about pivotal axis 73 is less apparent on the vehicle occupants.

By constructing the various mounting connections as specifically described above the possibility of metal-to-metal contact between the vehicle body structure and the chassis frame 10 is eliminated. It will also be appreciated that the resilient material interposed between the vehicle body structure and frame parts reduces the transfer of vibration and noise to the vehicle body structure. As pointed out hereinbefore the vehicle body structure as a whole is capable of oscillating about any of the axes 37, 45, 62, 63 and 73 with respect to the chassis frame 10. Thus, any flexing of the chassis frame 10 imposes very little strain upon the vehicle body structure and since the vehicle body structure is movable relatively to the frame as a unit the possibility of damage caused by the vehicle cab 15 moving relatively to the hood structure 16 and radiator grille panel 18 is mitigated. Furthermore, since the vehicle body structure is pivotal about axes which intersect at a common point 39 disposed near the center of gravity of the vehicle occupants such relative movement of the vehicle body structure is rendered less apparent to the vehicle occupants. Thus, the comfort of the vehicle occupants is enhanced considerably.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other modifications and adaptations of the invention as fall within the spirit and scope of the invention as defined in the appended claims.

What is claimed is:

1. In a motor vehicle having a longitudinally extending frame and a body, the combination including said frame and body comprising means for connecting said body to said frame for controlled relative movement therebetween including a plurality of link means, each of said link means having one end pivotally interconnected to said frame and its opposite end pivotally interconnected to said body, the pivotal axes of said link means with said body and said frame intersecting at a common point lying in a horizontal plane vertically spaced above said frame and link means.

2. In a motor vehicle having a longitudinal frame and a body vertically spaced above the frame, the combination including said frame and body comprising means extending between and connecting said body to said frame for controlled relative movement therebetween including a plurality of pivotal connecting means, the longitudinal axes of said pivotal connecting means intersecting at a common point lying in a horizontal plane vertically spaced above said frame and pivot connecting means, said point lying in a vertical plane containing the longitudinal median line of the frame.

3. In a motor vehicle having a longitudinal frame and a body, the combination including said frame and body comprising means for connecting said body to said frame for controlled relative movement therebetween including a pair of transversely aligned structures extending between and interconnecting said body and said frame, each of said structures having one part thereof pivotally connected to said frame and another part thereof pivotally connected to said body, the pivotal axes of said structures with respect to said body and said frame intersecting at a common point vertically spaced above said frame and structures, said common point lying in a vertical, transversely extending plane longitudinally spaced from a vertical, transversely extending plane containing said structures.

4. In a motor vehicle having a longitudinal frame and body, the combination including said frame and body comprising means for interconnecting said body and said frame for controlled relative movement therebetween including a pair of transversely aligned structures, and means pivotally connecting each of said structures to said frame and said body, the pivotal axes of said means intersecting at a common point vertically spaced above said frame and structures, said common point lying in a vertical, transversely extending plane longitudinally spaced from a vertical, transversely extending plane containing said means pivotally connecting each of said structures to said frame and said body.

5. In a motor vehicle having a longitudinal frame and a body, the combination including said frame and body comprising means for connecting said body to said frame for controlled relative movement therebetween including a first structure and a second structure longitudinally spaced from said first structure, and an intermediate structure longitudinally spaced between said first and second structures, each of said first and second structures including link means having one end pivotally connected to said body for pivotal movement about an axis intersecting a vertical plane containing the longitudinal median line of the frame at a point vertically spaced above said frame, said link means having its opposite end pivotally connected to said frame.

6. In a motor vehicle substantially as set forth in claim 5, in which, said intermediate structure includes resilient cushioning means interposed between said frame and body.

7. In a motor vehicle having a longitudinal frame including a pair of transversely spaced side sill members and a body, the combination including said frame and body comprising, means for connecting said body to said frame for controlled relative movement therebetween including a first pair of transversely aligned structures interconnecting one end of said body to said frame, a second pair of transversely aligned structures interconnecting the opposite end of said body to said frame, and a third pair of transversely aligned structures for interconnecting said body to said frame, said third pair of structures being longitudinally spaced between said first and second pairs of structures, two of said pairs of structures each comprising a pair of links pivotally interconnecting said side sill members to respective opposite sides of said body, each of said links being pivotally movable with respect to said frame about an axis, said axes intersecting a vertical plane containing the longitudinal median line at a common point.

8. In a motor vehicle substantially as set forth in claim 7, wherein each of said links is pivotally movable with respect to said body about an axis, said axes intersecting said vertical plane containing the longitudinal median line of said frame at said common point.

9. In a motor vehicle substantially as set forth in claim 8, wherein one of said pairs of structures includes a pair of transversely spaced flat pads of resilient material interposed between said body and frame, said pads being so oriented that lines perpendicular to the planes containing said pads intersect said vertical plane containing the longitudinal median line of the frame at said common point.

10. In a motor vehicle having a longitudinal frame, an operator's compartment and a radiator grille panel spaced forwardly of the operator's compartment and rigidly interconnected thereto whereby said operator's compartment and radiator grille panel are part of a composite structural body unit, the combination including said frame and composite structural body unit comprising means for connecting the rearwardmost end of said operator's compartment to said frame for controlled relative movement therebetween; and means for connecting said radiator grille panel to said frame whereby said composite structural unit is capable of moving relatively to said frame including a pair of laterally spaced links, each link having one end pivotally connected to said frame and its opposite end pivotally connected to respective opposite lateral end portions of said radiator grille panel whereby said links are capable of pivoting with respect to said radiator grille panel and said frame about axes intersecting at a common point vertically spaced above said frame and said links, said point lying in a vertical plane containing the longitudinal median line of the frame.

11. In a motor vehicle substantially as set forth in claim 10, wherein said means connecting the rearwardmost end of said operator's compartment to said frame for controlled relative movement therebetween includes a pair of laterally spaced links, each of said links having one end pivotally connected to said frame and its opposite end pivotally connected to a respective opposite side of said operator's compartment for pivotal movement with respect to said frame and operator's compartment about axes intersecting at a point vertically spaced above said frame and said links, said point lying in a vertical plane containing the longitudinal median line of the frame.

12. In a motor vehicle having a longitudinal frame, an operator's compartment and a radiator grille panel spaced forwardly of the operator's compartment and rigidly interconnected thereto whereby said operator's compartment and radiator grille panel are part of a composite structural body unit, the combination including said frame and composite structural body unit comprising means for connecting the rearwardmost end of said operator's compartment to said frame for controlled relative movement therebetween including a pair of laterally spaced links, each of said links having one end pivotally connected to said frame and its opposite end pivotally connected to the respective opposite side of said operator's compartment for pivotal movement with respect to said frame and operator's compartment, and means for connecting said radiator grille panel to said frame whereby said composite structural unit is capable of moving relative to said frame including a pair of laterally spaced links, each link having one end pivotally connected to said frame and its opposite end pivotally connected to respective opposite lateral end portions of said radiator grille panel whereby said links are capable of pivoting with respect to said radiator grille panel and said frame, the pivotal axes of said links connecting said radiator grille panel and said operator compartment to said frame intersecting at a common point vertically spaced above the frame, said common point lying in a vertical plane containing the longitudinal median line of the frame.

13. In a motor truck having a longitudinal frame, an operator's compartment above said frame, a radiator grille panel spaced forwardly of said operator's compartment and means rigidly interconnecting said operator's compartment and said radiator grille panel, the combination including said frame, radiator grille panel, operator's compartment and said means rigidly interconnecting said operator's compartment and said radiator grille panel comprising means for connecting said radiator grille panel to said frame including a pair of laterally spaced links, each link having one end pivotally connected to a respective opposite side of said frame and its opposite end pivotally connected to a respective opposite end portion of said radiator grille panel, the pivotal axes of said links with respect to said frame and said radiator grille panel intersecting at a common point disposed within the interior of said operator's compartment, said point being vertically spaced above said links and horizontally spaced rearwardly of said grille panel, said point lying in a vertical plane containing the longitudinal median line of the frame.

14. In a motor vehicle having a longitudinal frame comprising a pair of longitudinally extending, transversely spaced side sill members; a vehicle body including a radiator grille panel defining the forward end of said body; and means for supporting said body on said frame including a first pair of transversely spaced links, each of said links having one end pivotally connected to the respective sill member and its opposite end pivotally connected to the respective opposite side of said radiator grille panel, said means for supporting said body on said frame further including a second pair of transversely spaced links, each of said links having one end pivotally connected to a respective sill member and its opposite end pivotally connected to a respective opposite side of the rearward end of said body, the pivotal axes of said links with said frame and said vehicle body intersecting at a common point vertically spaced above said frame and links and horizontally spaced intermediate said radiator grille panel and the rearward end of said body, said point lying in a vertical plane spaced midway between said side sill members.

15. In a motor vehicle having a longitudinal frame comprising a pair of longitudinally extending, transversely spaced side sill members; a vehicle body including an operator's compartment, a hood structure extending forwardly from said operator's compartment and secured thereto, and a vertically disposed, transversely extending radiator grille panel secured to said hood structure and defining the forward extremity of said body; means for supporting said body above said frame including a first pair of transversely spaced links, each of said links having one end pivotally connected to a respective sill member and its opposite end pivotally connected to a respective end portion of the lower edge of said radiator grille panel, a second pair of transversely spaced links, each of said links having one end pivotally connected to a respective sill member and its opposite end pivotally connected to a respective side of the rearward end of said operator's compartment, the pivotal axes of said links with said frame and said vehicle body intersecting at a common point disposed in a vertical plane containing the longitudinal median line of said frame, and a pair of transversely spaced resilient mounting connections between respective opposite sides of said body and said sill members, said resilient mounting connections being longitudinally spaced between said first and second pairs of links.

16. In a motor vehicle substantially as set forth in claim 15, wherein each of said resilient mounting connections including a flat pad of resilient material interposed between said body and frame, said pads being disposed in planes inclined to a horizontal plane whereby lines perpendicular to the inclined planes containing said pads intersect said vertical plane containing the longitudinal median line of the frame at said common point.

17. In a motor vehicle having a longitudinal frame comprising a pair of longitudinally extending, transversely spaced side sill members; a vehicle body including an operator's compartment, a hood structure extending forwardly from said operator's compartment and secured thereto, and a vertically disposed, transversely extending radiator grille panel secured to said hood structure and defining the forward extremity of said body, said body further including a first transversely extending cross member secured to the lower edge of said radiator grille panel, a second transversely extending cross member secured to the underside of the rearward end of said operator's compartment, and a transversely extending channel-shaped member secured to the underside of said body and being longitudinally spaced between said first and second cross members; means for supporting said body above said frame including a pair of transversely spaced links, each of said links having one end pivotally connected to a respective sill member and its opposite end pivotally connected to a respective end portion of said first cross member, a second pair of transversely spaced links, each of said links having one end pivotally connected to a respective sill member and its opposite end pivotally connected to a respective end portion of said second cross member, the pivotal axes of said links with said side sill members and said cross members intersecting at a common point disposed within said operator's compartment and lying in a vertical plane containing the longitudinal median line of said frame, and a pair of transversely spaced, resilient mounting connections between respective opposite ends of said channel-shaped member and said sill members, said resilient mounting connections being longitudinally spaced between said first and second pairs of links.

18. In a motor vehicle substantially as set forth in claim 17, in which each of said resilient mounting connections includes a pair of brackets, each of said brackets being secured to a respective side sill member, each of said brackets having an inclined surface, a flat pad of resilient material disposed upon each of said inclined flat surfaces, a bracket secured to each opposite end portion of said channel-shaped member, each of said brackets secured to said channel-shaped member having a flat surface adapted to bear upon a respective pad of resilient material, said pads lying in inclined planes so oriented that lines perpendicular to the planes intersect said vertical plane containing the longitudinal median line of the frame at said common point.

References Cited in the file of this patent

UNITED STATES PATENTS

| 2,330,633 | Seyerle | Sept. 28, 1943 |
| 2,549,102 | Kramer | Apr. 17, 1951 |
| 2,708,133 | Sewelin et al. | May 10, 1955 |
| 2,746,765 | McCutchen | May 22, 1956 |
| 2,769,656 | Lee | Nov. 6, 1956 |

FOREIGN PATENTS

| 497,189 | Germany | May 5, 1930 |
| 514,391 | Great Britain | Nov. 7, 1939 |
| 872,389 | France | Feb. 9, 1942 |
| 1,067,696 | Germany | Oct. 22, 1959 |